(12) United States Patent
Tanaka

(10) Patent No.: US 11,112,843 B2
(45) Date of Patent: Sep. 7, 2021

(54) IMAGE PROCESSING DEVICE, IMAGE PROCESSING SYSTEM, AND CONTROL METHOD OF IMAGE PROCESSING DEVICE

(71) Applicant: FUJITSU LIMITED, Kawasaki (JP)

(72) Inventor: Ryota Tanaka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 131 days.

(21) Appl. No.: 16/105,272

(22) Filed: Aug. 20, 2018

(65) Prior Publication Data
US 2019/0064897 A1 Feb. 28, 2019

(30) Foreign Application Priority Data

Aug. 22, 2017 (JP) .............. JP2017-159325

(51) Int. Cl.
G06F 1/00 (2006.01)
G06F 1/26 (2006.01)
G06F 1/30 (2006.01)
G06F 13/40 (2006.01)

(52) U.S. Cl.
CPC .............. *G06F 1/26* (2013.01); *G06F 1/30* (2013.01); *G06F 13/4081* (2013.01)

(58) Field of Classification Search
CPC ........... G06F 1/26; G06F 13/4081; G06F 1/30
See application file for complete search history.

(56) References Cited

U.S. PATENT DOCUMENTS

| | | | |
|---|---|---|---|
| 5,787,261 A | 7/1998 | Osaka et al. | |
| 2003/0105984 A1* | 6/2003 | Masuyama | G06F 1/26 713/330 |
| 2017/0265274 A1* | 9/2017 | Hirth | F21V 29/77 |

FOREIGN PATENT DOCUMENTS

| | | |
|---|---|---|
| JP | 8-211975 | 8/1996 |
| JP | 2014-164488 | 9/2014 |
| JP | 2017-102659 | 6/2017 |

OTHER PUBLICATIONS

Japanese Office Action dated Feb. 24, 2021 from Japanese Application No. 2017-159325, 8 pages.

* cited by examiner

*Primary Examiner* — Xuxing Chen
(74) *Attorney, Agent, or Firm* — Staas & Halsey LLP

(57) ABSTRACT

A CPUs operate by predetermined power that is generated based on power supplied from a power source unit. A multiplexer (MUX) is supplied with power from the power source unit, and suspends connection between the CPUs and a second arithmetic-processing unit when the CPUs are connected to the second arithmetic-processing unit included in another system board, and connects the CPUs and the second arithmetic-processing unit after predetermined time passes.

5 Claims, 9 Drawing Sheets

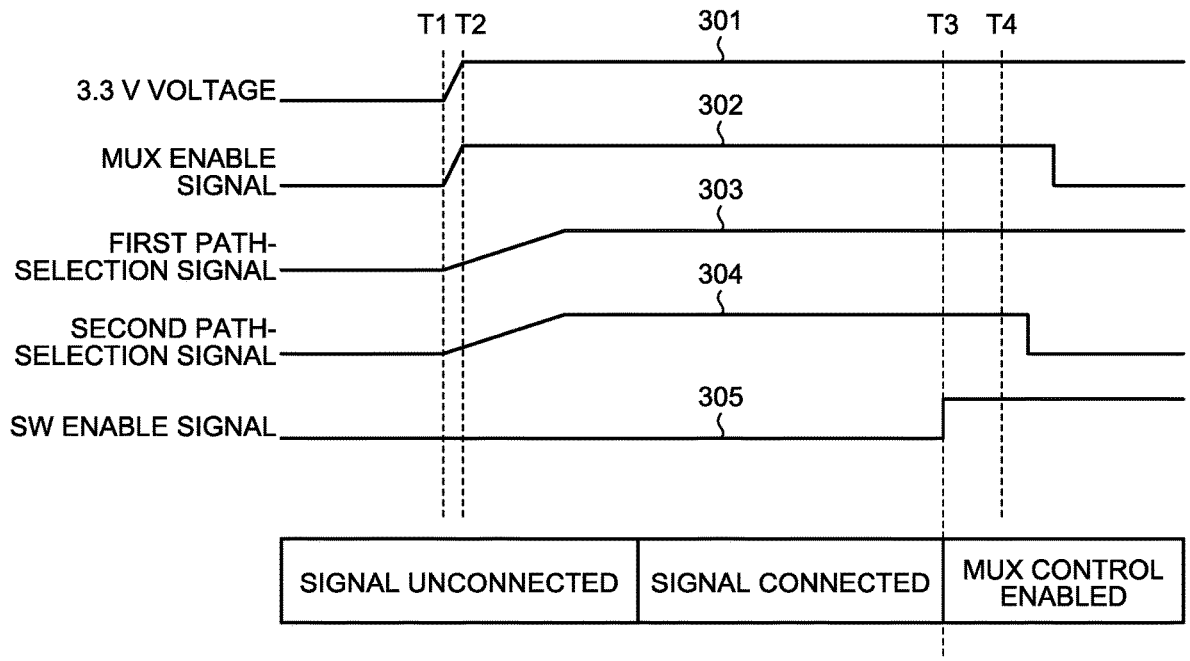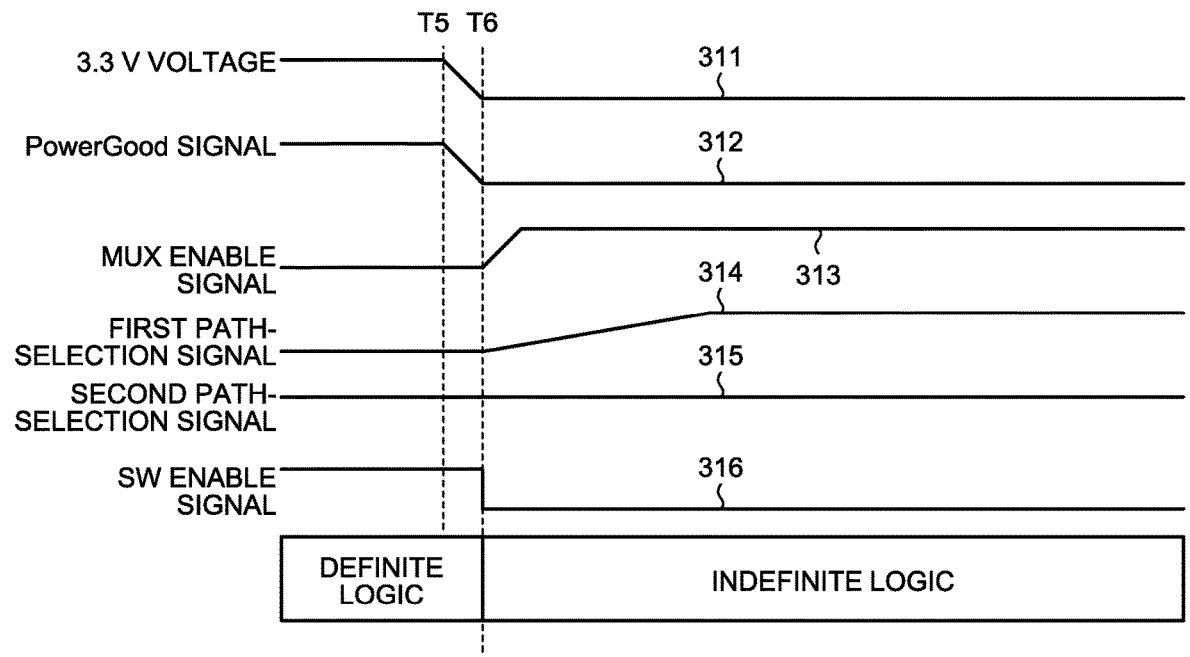

IMAGE PROCESSING DEVICE, IMAGE PROCESSING SYSTEM, AND CONTROL METHOD OF IMAGE PROCESSING DEVICE

CROSS-REFERENCE TO RELATED APPLICATION

This application is based upon and claims the benefit of priority of the prior Japanese Patent Application No. 2017-159325, filed on Aug. 22, 2017, the entire contents of which are incorporated herein by reference.

FIELD

The embodiments discussed herein are related to an image processing device, an image processing system, and a control method of an image processing device.

BACKGROUND

In recent years, more server devices have a symmetric multiprocessing (SMP) structure in which multiple central processing units (CPU) are mounted. This type of server is designed assuming that multiple CPUs are mounted on a single mother board. Furthermore, this type of server can include more than one system board corresponding to an independent server in a single casing. In this case, flexible SMP coupling is demanded for each system board mounted on the server.

To enable flexible SMP coupling, it is desirable to satisfy following requirements. For one thing, it is preferable that transmission paths of signals among CPUs be switched flexibly. For another thing, it is preferable that a failure that has occurred in a partition do not influence other partitions. For still another thing, it is preferable that when a power failure or the like occurs in a system board, the system board having the power failure be able to be removed and inserted while the other system boards are operating.

For this matter, a multiport multiplexer (MUX) having plural ports enabling communication using different transmission paths for signals among respective CPUs has conventionally been used for signals communicated among CPUs over system boards. In this configuration, a transmission path can be flexibly selected. Moreover, even if a signal level decreases due to occurrence of a power failure in a specific partition, an influence on signal levels in other partitions is suppressed because transmission paths of signals are different, and an influence among partitions can be reduced.

As a technique of connecting boards on which multiple CPUs are mounted, there is a conventional technique in which a virtual server is constructed by installing a switch to connect a CPU blade in which multiple CPUs are mounted with another CPU blade (Japanese Laid-open Patent Publication No. 2017-102659).

However, the number of signals shared among CPUs, such as reset and synchronization of clocks among CPUs, has recently been increasing. Therefore, when the CPUs are connected using the multiport MUX to support all kinds of signal types, the number of connector pins can increase to be enormous. It is also difficult to increase the number of connector pins to cover the number of signal types as it requires because there is a limit in the number of pins. Furthermore, it can be physically difficult to arrange it because a space for wiring increases as the number of connector pins increases.

As described above, it has become difficult to connect CPUs using a multiport MUX in recent years. Accordingly, it is difficult to enable insertion and removal of a specific system board with the other system boards kept operating, and to suppress an influence of a failure occurring in a specific system board on the other system boards, while enabling flexible switching of signals among CPUs. That is, it is difficult to maintain the stability of systems by a conventional method of connecting CPUs.

Moreover, even if a conventional technique of structuring a virtual server in which a switch is installed is used, there is no difference in communication paths among CPUs, and it is difficult to maintain the stability of systems.

SUMMARY

According to an aspect of an embodiment, an information processing device includes: a first arithmetic-processing unit that operates by predetermined power generated based on power supplied from a power source; and a connection control unit that suspends connection, when power is supplied from the power source and the first arithmetic-processing unit is connected to a second arithmetic-processing unit included in another information processing device, the connection between the first arithmetic-processing unit and the second arithmetic-processing unit, and that connects the first arithmetic-processing unit and the second arithmetic-processing unit after predetermined time passes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a time chart expressing actions of respective signals when a system board is inserted;

FIG. 6 is a time chart expressing actions of respective signals when a short circuit occurs in a power source;

DESCRIPTION OF EMBODIMENT(S)

Preferred embodiments of the present invention will be explained with reference to accompanying drawings. The following embodiments are not intended to limit the information processing device, the information processing system, and the control method of an information processing device disclosed in the present application.

[a] First Embodiment

Figure 1:
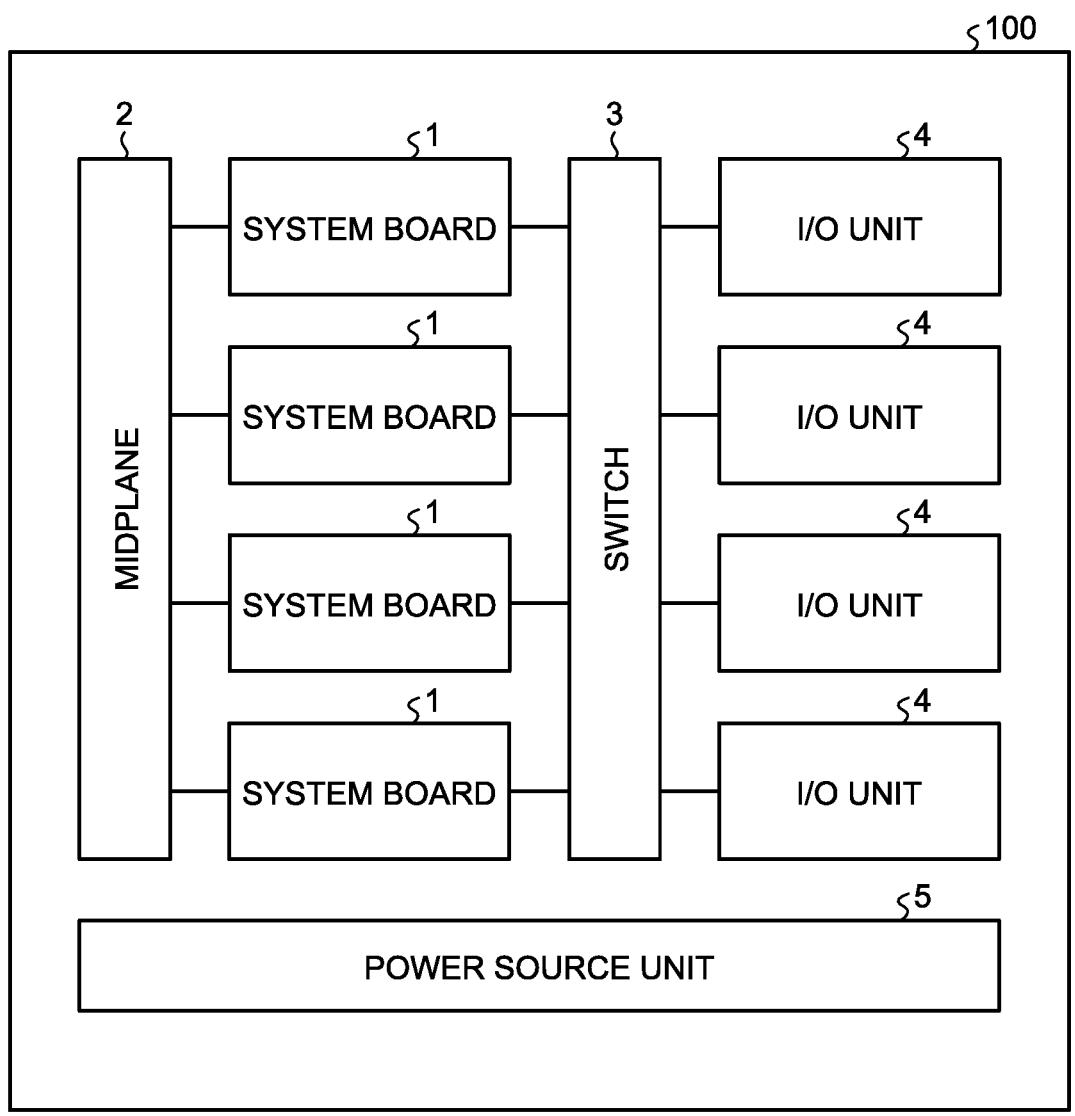
FIG. 1 is a configuration diagram of an information processing device.

FIG. 1 is a configuration diagram of an information processing device. An information processing system 100 according to a present embodiment includes system boards 1, a midplane 2, a switch 3, and input/output (I/O) units 4 as illustrated in FIG. 1.

The system board 1 has plural CPUs and a memory. The CPUs and the memory mounted on the system board 1 perform arithmetic processing.

The midplane 2 has a circuit board on which a signal circuit to connect the CPUs mounted on the system boards 1 mutually are arranged. The system board 1 can be inserted to and removed from the midplane 2. The midplane 2 connects the inserted system boards 1 with each other by the signal circuit. The system boards 1 inserted in the midplane 2 are communicable through the signal circuit. Furthermore, the midplane 2 has a power supply path to supply power that is supplied from a power source unit 5 to the system boards 1 connected to the midplane 2. By using the power supply path in the midplane 2, the system boards 1 can supply power to each other also. This midplane 2 corresponds to an example of a "connection mechanism".

The switch 3 is a path switching device that switches connection between the system boards 1 and the I/O units 4. The switch 3 connects the system boards 1 and the I/O units 4 in a one-to-one, one-to-many, many-to-one, or many-to-many relationship according to a designation from an operator.

The I/O unit 4 has a hard disk, a peripheral component interconnect (PCI) device, and the like. For example, the I/O units 4 act according to an instruction by a CPU on the system board 1.

A set of the system board 1 and the I/O unit 4 constitutes a partition that acts as one arithmetic processing device. For example, a set of two units of the system boards 1 and one unit of the I/O units 4 out of the ones illustrated in FIG. 1 forms one partition. Moreover, one unit of the system board 1 out of the rest of the system boards 1 and one unit of the I/O units 4 forms one partition. Furthermore, a set of the remaining one unit of the system board 1 and one unit of the I/O units 4 forms one partition. Thus, three partitions are formed in one unit of the information processing system 100. The structure of the partitions can be flexibly configured.

The power unit (power supply unit (PSU)) 5 converts electricity supplied from, for example, utility power of 12 volts (V) into a direct current and adjusts the voltage, to supply to the respective parts, such as the system board 1, the midplane 2, the switch 3, and the I/O unit 4. In FIG. 1, power supply paths from the power source unit 5 to the respective parts are omitted. The power from the power source unit 5 generates power suitable to drive the respective parts on the system board 1 of, for example, 3.3 V in the system board 1, to be supplied to the respective parts. For example, the power source unit 5 supplies power to each of the system boards 1 inserted in the midplane 2 through the midplane 2. This power source unit 5 corresponds to an example of a "power source".

There are not many low cost general-purpose PSUs that output desirable power (3.3 V) that is suitable for driving the respective parts on the system board 1. When the output power of a PSU and a desirable power are different, it is difficult to obtain desirable power quickly even if the system board 1 is inserted in the midplane 2. Therefore, the system board 1 according to the present embodiment uses power that is supplied from another active system board 1 as power to disable a signal to the MUX. Because the power supplied from the other active system board 1 is in a stable supply state at 3.3 V, the power can be used as soon as the system board 1 is connected to the midplane 2. However, in a structure in which power from the other system board 1 is always used as a power source for operation, when the other system board 1 is removed from the midplane 2, the system board 1 that is supplied with power therefrom also stops at the same time. Therefore, the system boards 1 according to the present embodiment are configured to operate by power that is directly supplied from the power source unit 5 after the operation becomes stable.

Figure 2:
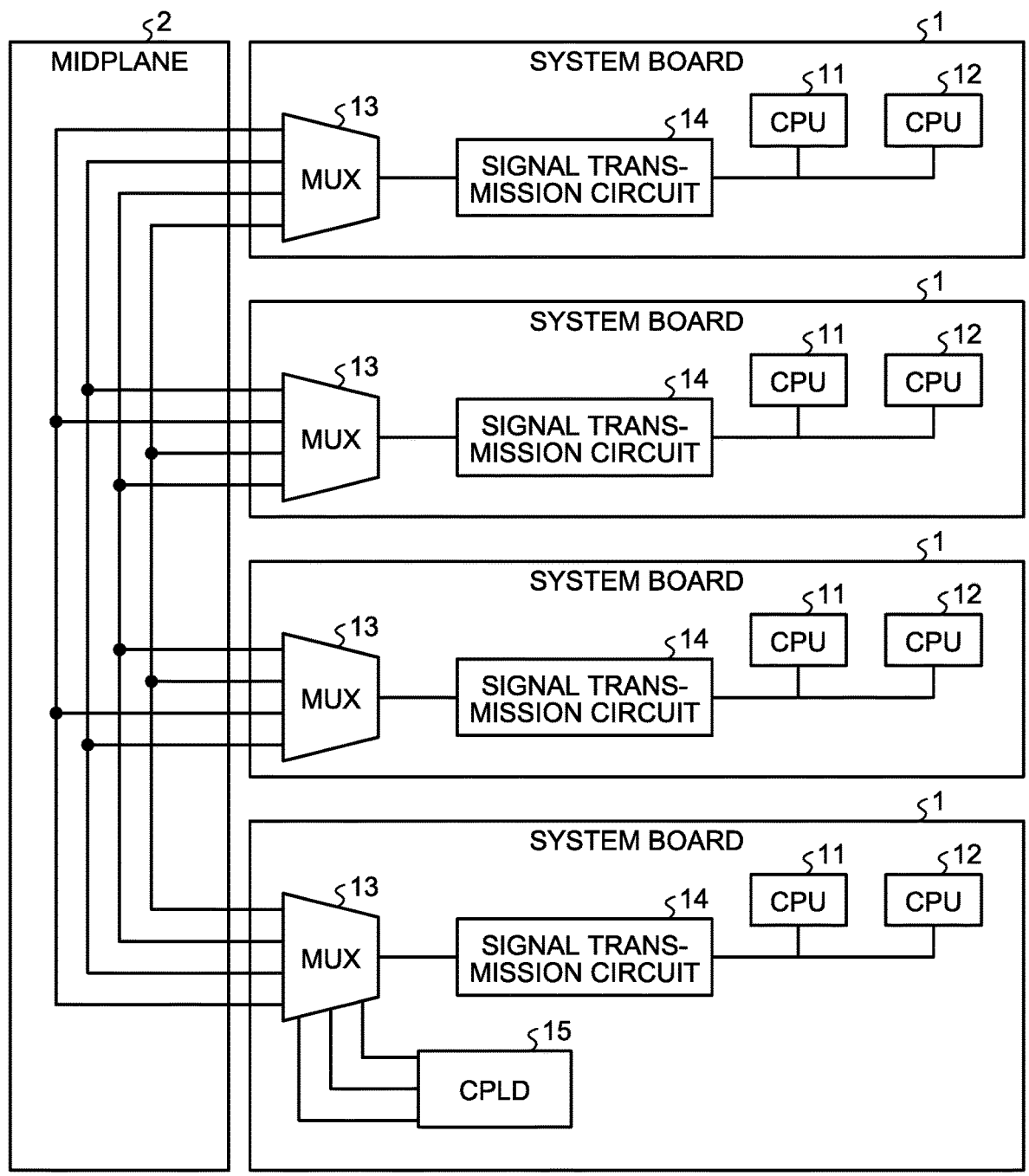
FIG. 2 is a diagram illustrating a connection state of system boards according to a first embodiment.

Next, connection among the system boards 1 is explained referring to FIG. 2. FIG. 2 is a diagram illustrating a connection state of the system boards according to the first embodiment. FIG. 2 illustrates a state in which four units of the system boards 1 are inserted in the midplane 2. In FIG. 2, wirings except wiring connecting the system boards with each other are omitted.

As illustrated in FIG. 2, the system board 1 includes CPUs 11 and 12, a MUX 13, a signal transmission circuit 14, and a complex programmable logic device (CPLD) 15. For convenience' sake, the CPLD 15 is illustrated in the system board 1 at the bottom in FIG. 2, but the CPLD 15 is mounted in the other system boards 1 in an actual state.

The midplane 2 has the same number of paths as the number of the system boards 1 to connect among system boards 1. The midplane 2 connects all of the inserted system boards 1 by a single path, and has four of those paths.

The CPUs 11 and 12 are arithmetic processing units. The CPUs 11 and 12 receive power generated by a regulator 17 through a power supplying unit 141 to operate. The CPUs 11 and 12 are connected to the MUX 13 through the signal transmission circuit 14. The CPUs 11 and 12 communicate with the CPUs 11 and 12 mounted on the other system boards 1 through the MUX 13 and the midplane 2. The CPUs 11 and 12 correspond to an example of "first arithmetic-processing unit" and a "first arithmetic processing device". Furthermore, the CPUs 11 and 12 mounted on the other system board 1 correspond to an example of a "second arithmetic processing unit" and a "second arithmetic processing device".

The signal transmission circuit 14 is, for example, a gunning transceiver logic (GTL) circuit. The signal transmission circuit 14 processes a signal input from the MUX 13 for signal transmission to output to the CPU 11 or 12. On the other hand, the signal transmission circuit 14 processes a signal input from the CPU 11 or 12 for signal transmission to output to the MUX 13.

The CPLD 15 is a circuit to control the operation of the MUX 13. The CPLD 15 includes a general-purpose input output (GPIO) pin. The GPIO pin of the CPLD 15 is connected to the MUX 13. The CPLD 15 outputs an enable signal to set the MUX 13 to effective or ineffective and a path selection signal to perform path selection to the MUX 13. In the present embodiment, the CPLD 15 outputs the enable signal and the path selection signal according to a predetermined settings stored therein. The CPLD 15 can receive an input of a setting from another microcomputer and can output the enable signal and the path selection signal according to the input setting. This CPLD 15 corresponds to an example of a "signal output circuit".

The MUX 13 selectively switches paths extending from the midplane 2 and paths connecting to the signal transmission circuit 14. Specifically, the MUX 13 connects a path that is specified by the CPLD 15 out of the paths extending from the midplane 2 with the path connecting to the signal transmission circuit 14. The MUX 13 is connected to the MUX 13 on the other system board 1 through the midplane 2. In the present embodiment, to the MUX 13, four paths extending to the midplane 2 to connect to the other four system boards 1 are connected.

Figure 3:
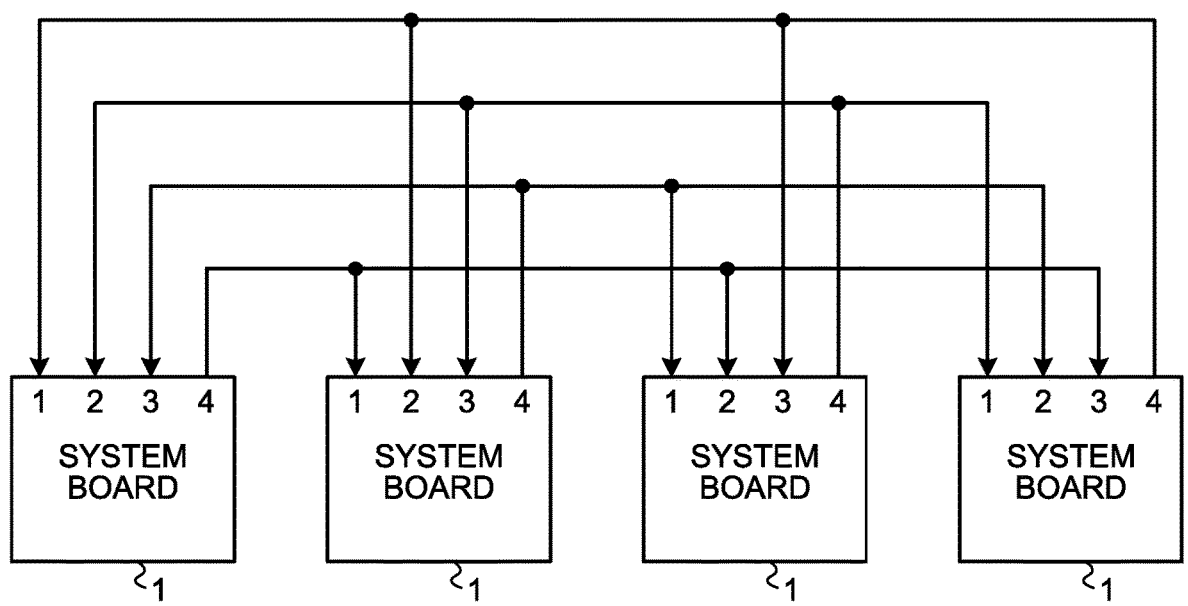
FIG. 3 is a diagram for explaining communications among the system boards according to the first embodiment.

FIG. 3 is a diagram for explaining communications among the system boards according to the first embodiment. The system board 1 according to the present embodiment has four ports as illustrated in FIG. 3. The system board 1 uses one port as a port to transmit a signal to the other system boards 1, and remaining three ports as a port to receive a signal from the other system boards 1.

Furthermore, to a path extending from the signal transmission port of the system board 1, the other three system boards 1 are connected in a daisy chain structure. That is, the path extending from the signal transmission port of the system board 1 branches off into three, and the branch paths are respectively connected to the different system boards 1.

The MUX 13 selects the path that is connected to the signal transmission port out of the four paths extending from the midplane 2 to connect to the CPUs 11 and 12 when the system board 1 on which the MUX 13 itself is mounted transmits a signal to the other system board 1. On the other hand, when the system board 1 on which the MUX 13 itself is mounted receives a signal from the other system board 1, the MUX 13 selects the path connected to the system board 1 of the source of the signal to connect to the CPUs 11 and 12.

Figure 4:
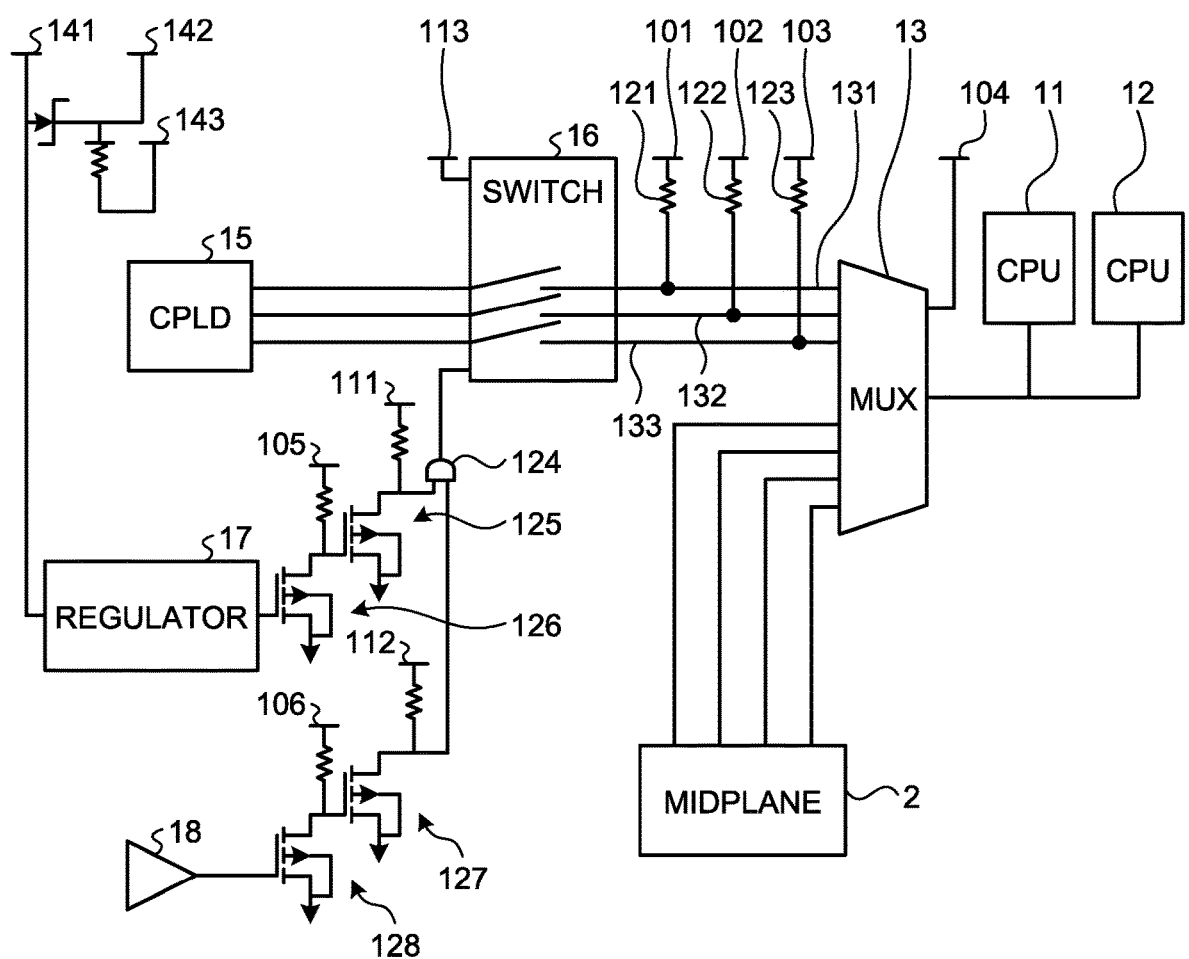
FIG. 4 is a schematic circuit diagram of a system board.

Next, an operation when inserting to the MUX 13 of the system board 1 is explained referring to FIG. 4. FIG. 4 is a schematic circuit diagram of the system board.

Power supply units 101 to 106 in FIG. 4 are power supply members, such as a power supply pin and a power supply path, to supply power that is supplied with power through the midplane 2 from the other system boards 1 inserted in the midplane 2. The power supply units 101 to 106 supply a voltage of, for example 3.3 V.

A power supply unit 141 is supplied with power output from the regulator 17. The power supply unit 141 supplies the power supplied from the regulator 17 to, for example, power supply units 111 to 113, the CPUs 11 and 12, the MUX 13, the CPLD 15, a switch 16, a driver 18, and the like. Moreover, a power supply unit 142 is connected to a power source of the regulator 17 of the other system board 1. When the voltage supplied from the regulator 17 in the power supply unit 142 is low, power output from the regulator 17 of the other system board 1 flows in the power supply unit 142. A power supply unit 143 is connected to, for example, the power supply units 101 to 106. The power supply unit 143 supplies power with a higher voltage out of the power supply units 141 and 142 to the power supply units 101 to 106.

The regulator 17 receives a supply of power from the power source unit 5. For example, the regulator 17 acquires power at 5 V obtained by stepping down power that has been output at 12 V by the power source unit 5. The regulator 17 steps down, for example, the voltage of 5 V to 3.3 V to generate a power source type to operate respective parts. The regulator 17 then supplies the generated power source type to the CPUs 11 and 12, the driver 18, and the CPLD 15. Moreover, the regulator 17 outputs the power at 3.3 V to the power supply unit 141. The power output from the power supply unit 141 is sent to the power supply units 111 to 113.

To the MUX 13 according to the present embodiment, four signal paths extending from the midplane 2 are connected. The four signal paths are used for signal transmission between the CPUs 11 and 12 and the other system board. Furthermore, the MUX 13 is connected to the CPLD 15 by three paths 131 to 133 through the switch 16. Pins in the MUX 13 to connect to the four signal paths extending from the midplane 2 are shorter than the power supply pin to receive power supply from the power source unit 5 in the system board 1 and the other system board 1. Therefore, when the system board 1 is connected to the midplane 2, the signal paths among the system boards 1 are connected after power supply to the system board 1 is started. This MUX 13 corresponds to an example of a "connection control circuit" and a "connection control unit".

The path 131 is a path to input a MUX enable signal to the MUX 13. When a value of the MUX enable is High, the MUX 13 becomes ineffective. On the other hand, when the value of the MUX enable signal is Low, the MUX 13 becomes effective. The path 132 is a path to input a first path-selection signal to the MUX 13. The path 133 is a path to input a second path-selection signal to the MUX 13. The MUX 13 receives notification of setting for a path to be selected from among the four signal paths extending from the midplane 2 by a combination of the first path-selection signal and the second path-selection signal. The MUX enable signal corresponds to an example of a "first control signal". The first path-selection signal and the second path-selection signal correspond to an example of a "second control signal".

Furthermore, to the path 131, the power supply unit 101 is connected between the switch 16 and the MUX 13 through a resistor 121. The resistor 121 has a resistance value of, for example, 1 kiloohm (KΩ). Moreover, to the path 132, the power supply unit 102 is connected between the switch 16 and the MUX 13 through a resistor 122 having a higher resistance value than the resistor 121. The resistor 122 has a resistance value of, for example, 10 KΩ. Furthermore, to the path 133, the power supply unit 103 is connected between the switch 16 and the MUX 13 through a resistor 123 having a higher resistance value than the resistor 121. The resistor 123 has a resistance value of, for example, 10 KΩ.

This path 131 corresponds to an example of a "first input path". Moreover, the paths 132 and 133 correspond to an example of a "second input path". Furthermore, a path to input the power that is output from the power supply unit 101 to the MUX 13 through the resistor 121, a path to input the power that is output from the power supply unit 102 to the MUX 13 through the resistor 122, and a path to input the power that is output from the power supply unit 103 to the MUX 13 through the resistor 123 correspond to an example of a "plurality of input paths".

The switch 16 operates by power supplied from the power supply unit 113. The switch 16 connects or disconnects each of the paths 131 to 133 connecting the CPLD 15 and the MUX 13. When the switch 16 is ineffective, a signal output from the CPLD 15 is not input to the MUX 13. The switch 16 is connected to an AND circuit 124. The switch 16 receives an input of a SW (switch) enable signal from the AND circuit 124. The switch 16 becomes effective when a value of the SW enable signal is High. On the other hand, when the value of the SW enable signal is Low, the switch 16 becomes ineffective.

The regulator 17 includes a digital(D)D convertor. The regulator 17 is supplied with power that is output from the power source unit 5. In FIG. 4, a power supply path from the power source unit 5 is not illustrated. The regulator 17 outputs a power supply voltage based on the supplied power. In the present embodiment, the regulator 17 outputs a voltage of 3.3 V.

The regulator 17 monitors an output of itself, and compares a predetermined threshold voltage and its own output voltage. When the own output voltage becomes equal to or higher than the threshold voltage, the regulator 17 outputs power to the respective parts on the system board 1. The regulator 17 determines that power is supplied from the power source unit 5 to be able to output a desired voltage stably, and outputs a PowerGood signal. An output terminal of the PowerGood signal of the regulator 17 is connected to a gate of a field effect transistor (FET) switch 126.

The FET switch 126 is an N-channel FET. That is, the FET switch 126 is turned on when a voltage equal to or higher than the threshold voltage having a value of High is applied to the gate. To the gate of the FET switch 126, an output terminal of the PowerGood signal of the regulator 17 is connected. Furthermore, the source of the FET switch 126 is connected to the gate of the power supply unit 105 and an FET switch 125. Moreover, the drain of the FET switch 126 is connected to the ground.

The FET switch 125 is an N-channel FET. That is, the FET switch 125 is turned on when a voltage equal to or higher than the threshold voltage having a value of High is applied to the gate. To the gate of the FET switch 125, the source of the FET switch 126 is connected. Moreover, the source of the FET switch 125 is connected to the power supply unit 111 and the AND circuit 124. Furthermore, the drain of the FET switch 125 is connected to the ground.

A value of a voltage output from the FET switch 125 and input to the AND circuit 124 is explained. When the system board 1 is connected to the midplane 2, the power supply unit 111 outputs a voltage that is supplied from the power supply unit 141. Moreover, the power supply unit 105 outputs a voltage that is output from the other system board 1. The FET switch 125 is turned on by the output from the power supply unit 105. When the FET switch 125 is turned on, the power supply unit 111 is connected to the ground and therefore, a voltage having a value of Low is input to the AND circuit 124. Thereafter, the regulator 17 outputs, when the own output voltage becomes equal to or higher than the threshold voltage, the PowerGood signal to the gate of the FET switch 126. Thus, a voltage having a value of High is applied to the gate of the FET switch 126, and the FET switch 126 is turned on. When the FET switch 126 is turned on, the power supply unit 105 is connected to the ground and therefore, a voltage having a value of Low is applied to the gate of the FET switch 125 and the FET switch 125 is turned off. When the FET switch is turned off, the voltage having a value of High that is output from the power supply unit 111 is input to the AND circuit 124.

An output terminal of the driver 18 is connected to the gate of the FET switch 128. The driver 18 applies a voltage supplied by the regulator 17 to the gate of a FET switch 128. The driver 18 includes a timer to measure predetermined time until sufficient time passes after the output voltage becomes stable. The driver 18 suspends application of a voltage to the FET switch 128 until measurement of predetermined time is completed by the timer, and starts the application of the voltage to the FET switch 128 after the predetermined time passes. That is, the driver 18 keeps the MUX 13 and the switch 16 in the ineffective state until the operation of the CPUs 11 and 12 or the like becomes stable. The power supplied from the power source unit 5 is converted to desirable power by the regulator 17 to be supplied to the respective parts. However, at a start of the respective parts, the operation is not stable, and it takes time until the operation becomes stable. Particularly, the MUX 13 is the part to transfer a signal to the other system board 1, and is suspended for predetermined time by the driver 18 until the operation is stable. This predetermined time is, for example, several tens of milliseconds (ms).

The FET switch 128 is an N-channel FET. That is, the FET switch 128 is turned on when a voltage equal to or higher than the threshold voltage having a value of High is applied to the gate. To the gate of the FET switch 128, the output terminal of the driver 18 is connected. Moreover, the source of the FET switch 128 is connected to the power supply unit 106 and the gate of a FET switch 127. Furthermore, the drain of the FET switch 128 is connected to the ground.

The FET switch 127 is an N-channel FET. That is, the FET switch 127 is turned on when a voltage equal to or higher than the threshold voltage having a value of High is applied to the gate. To the gate of the FET switch 127, the source of the FET switch 128 is connected. Furthermore, the source of the FET switch 128 is connected to the power supply unit 112 and the gate of the FET switch 127. Moreover, the drain of the FET switch 127 is connected to the ground.

A value of a voltage that is output from the FET switch 127 and input to the AND circuit 124 is explained. When the system board 1 is connected to the midplane 2, the power supply unit 106 outputs a voltage that is supplied from the other system board 1. The FET switch 127 is turned on by the output from the power supply unit 106. When the FET switch 127 is turned on, the power supply unit 112 is connected to the ground and therefore, a voltage having a value of Low is input to the AND circuit 124. Furthermore, when the driver 18 receives an input of power that is supplied from the regulator 17 to apply a voltage of High to the gate of the FET switch 128, the FET switch 128 is turned on. To output a stable voltage, the driver 18 does not start outputting a voltage immediately even when power supply from the power source unit 5 is started, but after sufficient time has passes since the voltage becomes stable after predetermined time passes, outputs a voltage having a value of High. This time until the driver 18 starts stable output corresponds to an example of "predetermined time".

When the FET switch 128 is turned on, the power supply unit 106 is connected to the ground and therefore, a voltage having a value of Low is applied to the gate of the FET switch 127, and the FET switch 127 is turned off. When the FET switch 127 is on, an input path of the AND circuit 124 is connected to the ground, and a voltage having a value of Low is input to the AND circuit 124. On the other hand, when the FET switch 127 is on, the input path of the AND circuit 124 is not connected to the ground and receives an input of voltage having a value of High that is output from the power supply unit 112.

Next, operation of the respective parts of the system board 1 when the system board 1 is inserted to the midplane 2 and when the system board 1 is connected to the midplane 2 is explained collectively. In this example, a case in which the system board 1 has already been connected to the midplane 2 in addition to the system board 1 that is additionally inserted is explained.

When the system board 1 is inserted to the midplane 2, the power supply paths to the system board 1 from the power source unit 5 and the other system boards 1 are connected prior to the signal path among the system boards 1 due to differences in length of the pins.

When the power supply paths are connected in the system board 1, the power supply units 101 to 106 start supply of a voltage that is output from the other system boards 1. Moreover, when the system board 1 is connected to the midplane 2 and power supply from the power source unit 5 is started, the power supply units 111 and 113 start output of a voltage. The driver 18 starts output of a voltage of High after sufficient time has passed since the output becomes stable. The MUX 13 receives power supply from the power supply unit 104 to start driving. Receiving power supply from the other active system board 1 by the MUX 13 from the power supply unit 104 correspond to an example of receiving "power supply from an external device".

In this state, a voltage having a value of High is input to the path connecting to the FET switch 127 of the AND circuit 124. On the other hand, soon after the system board 1 is connected to the midplane 2 and power supply from the power source unit 5 is started, a voltage having a value of Low is input to the path connecting to the FET switch 125 of the AND circuit 124. In this case, the AND circuit 124 outputs the SW enable signal having the value of Low. That is, the switch 16 becomes ineffective. That is, the signal path between the CPLD 15 and the MUX 13 is disconnected, and the MUX 13 is not controlled by the CPLD 15.

In this case, a voltage that is output from the power supply unit 101 is input to the path 131. Furthermore, a voltage that is output from the power supply unit 102 is input to the path 132. Moreover, a voltage that is output from the power supply unit 103 is input to the path 133. Because the resistance value of the resistor 121 that is connected to the power supply unit 101 is smaller than the resistance value of the resistors 122 and 123 connected to the power supply units 102 and 103, the voltage input to the path 131 reaches a voltage having the value of High earlier than the voltage input to the paths 132 and 133. Therefore, the MUX enable signal having the value of High is input before the first and the second path selection signals become High. Accordingly, the MUX 13 becomes ineffective before the paths connecting the midplane 2 and the CPUs 11 and 12 are connected. That is, the paths connecting the midplane 2 and the CPUs 11 and 12 are not to be connected. In the present embodiment, signal input timings are varied using the resistors, but other structures can be applied as long as the signal input timings can be varied. For example, it can be structured by using a capacitor, a delay circuit, or the like to vary the signal input timings.

Thereafter, the regulator 17 outputs a voltage having the value of High to the path connecting to the FET switch 125 of the AND circuit 124. In this case, the AND circuit 124 outputs the SW enable signal having the value of High. That is, the switch 16 becomes effective. The switch 16 connects the paths 131 to 133 when being effective. Thus, the MUX 13 is controlled by the CPLD 15. When the switch 16 is connected, the CPLD 15 outputs the first and the second path selection signals to select a predetermined path to the paths 132 and 133. Next, the CPLD 15 outputs a voltage having the value of High to the path 131. The MUX 13 receives an input of the MUX enable signal having the value of Low from the path 131. The MUX 13 then becomes effective. The MUX 13 receives the first and the second path selection signals output from the CPLD 15 from the paths 132 and 133. The MUX 13 selects one signal path out of the fours signal paths extending from the midplane 2 according to the input first and the second path selection signals to connect to the CPUs 11 and 12.

In this example, the case in which the additional system board 1 is inserted to the midplane 2 in which the other system board 1 has already been inserted has been explained. When the other system board 1 has not been inserted to the midplane 2, because insertion does not affect any system board, there is no problem even if the operation described above is not performed at the time of insertion of the system board 1.

Next, operation of the respective parts of the system board 1 when an appropriate output of the regulator 17 is disabled in the system board 1 that is inserted to the midplane 2 is explained. The case in which an appropriate output of the regulator 17 is disabled includes, for example, a case when a short circuit occurs in an output system of the power source unit 5, a case in which an overcurrent protective function of the regulator 17 is activated, or a case of a failure of the regulator 17. In this example, the case of occurrence of a short circuit in a power source is explained as an example.

When a short circuit occurs in the power source, the regulator 17 stops output of the PowerGood signal. Thus, the FET switch 126 is turned off and the FET switch 125 is turned on. When the FET switch 125 is turned on, a voltage having the value of Low is input to the AND circuit 124.

Moreover, power supply to the driver 18 can be stopped depending on a condition of the short circuit of the power source. When power supply to the driver 18 is stopped, the FET switch 128 is turned off, and the FET switch 127 is turned on. When the FET switch 127 is turned on, a voltage having the value of Low is input to the AND circuit 124. On the other hand, when power supply to the driver 18 is not stopped, a voltage having the value of High is input to the AND circuit 124.

Regardless of the power supply state to the driver 18, at least one of two input systems to the AND circuit 124, a voltage having the value of Low is input. In this case, the AND circuit 124 inputs the SW enable signal having the value of Low to the switch 16. The switch 16 thereby becomes ineffective. Thus, the paths connecting the CPLD 15 and the MUX 13 are disconnected.

In this case, because input from the other system board 1 is not stopped, the power supply units 101 to 103 continue the output of a voltage having the value of High. Because the resistance value of the resistor 121 that is connected to the power supply unit 101 is larger than the resistance value of the resistors 122 and 123 connected to the power supply units 102 and 103, the voltage input to the path 131 reaches a voltage having the value of High earlier than the voltage input to the paths 132 and 133. The MUX 13 then receives the MUX enable signal having the value of High from the input path 131. Thus, the MUX 13 becomes ineffective before the voltage input to the paths 132 and 133 changes. Accordingly, the MUX 13 becomes ineffective before a logic of the first and the second path-selection signals becomes indefinite, and can reduce an influence caused by the logic of the first and the second path-selection signals being indefinite on the other system boards 1.

Next, actions of respective signals at the time of insertion of the system board 1 into the midplane 2 are explained. FIG. 5 is a time chart expressing actions of respective signals at the time of insertion of a system board. In FIG. 5, as it goes to a leftward direction of the diagram, time elapses.

A graph 301 indicates changes of a voltage of 3.3 V that is supplied by the power supply units 101 to 106. A graph 302 indicates changes of the MUX enable signal. A graph 303 indicates changes of the first path-selection signal. A graph 304 indicates changes of the second path-selection signal. A graph 305 indicates changes of the SW enable signal. The graphs 301 to 305 all indicate that the voltage increases as they rise.

Upon insertion of the system board 1 to the midplane 2 at time T1, an input voltage from the other system board 1 starts increasing as indicated in the graph 301. At this time, the SW enable signal maintains the value of Low. Therefore, the switch 16 is ineffective, and the CPLD 15 and the MUX 13 are in a disconnected state. Therefore, the voltage outputs by the power supply units 101 to 103 are input to the MUX 13. As the input voltage from the other system board increases, the value of the MUX enable signal also increases as indicated in the graph 302, to reach High at time T2. Although the first and the second path-selection signals also increase as indicated in the graphs 303 and 304, the increase speed is slow because the resistance value of the resistors 122 and 123 is high compared to the resistance value of the resistor 121. Therefore, the first and the second path-selection signals become High after the MUX enable signal becomes High. In this state, the pins of the MUX 13 to connect to the four paths of the midplane 2 have not been connected to the four paths of the midplane 2 yet due to differences in length of the pins, and the signals are in an unconnected state. Thereafter, by the pins of the MUX 13 to connect to the four path of the midplane 2 coming into contact with the four paths of the midplane 2, the signals become a connected state. Thereafter, the driver 18 waits until the output becomes stable, and outputs a voltage having the value of High when sufficient time passes thereafter. Thus, as indicated in the graph 305, the SW enable signal becomes High at time T3 when sufficient time has passed since the output of the driver 18 becomes stable. Thus, the CPLD 15 is enabled to control the MUX 13. Thereafter, the CPLD 15 outputs the first and second path-selection signals according to the setting. In this example, the CPLD 15 outputs the first path-selection signal having the value of High and the second path-selection signal having the value of Low as indicated in the graphs 303 and 304. The CPLD 15 outputs the MUX enable signal having the value of Low, and the MUX enable signal thus becomes Low at time T4 as indicated in the graph 302, and the MUX 13 becomes effective. Thus, the MUX 13 connects one out of the four paths extending from the midplane 2 with the CPUs 11 and 12.

Next, actions of the respective signals in the system board 1 when a short circuit occurs in a power source is explained referring to FIG. 6. FIG. 6 is a time chart expressing actions of respective signals when a short circuit occurs in a power source. In FIG. 6, as it goes to a leftward direction of the diagram, time elapses.

A graph 311 indicates changes of a voltage of 3.3 V that is supplied from the power supply units 111 to 113. A graph 312 indicates changes of the PowerGood signal. A graph 313 indicates changes of the MUX enable signal. A graph 314 indicates changes of the first path-selection signal. A graph 315 indicates changes of the second path-selection signal. A graph 316 indicates changes of the SW enable signal. The graphs 311 to 315 all indicate that the voltage increases as they rise. In this example, a case in which the CPLD 15 outputs the first path-selection signal having the value of Low and the second path-selection signal having the value of High before the power failure occurs as indicated in the graphs 314 and 315 is explained.

When a short circuit occurs at time T5, the voltage supplied from the power supply units 111 to 113 start decreasing as indicated in the graph 311. At this time, because the output of the regulator 17 also decreases, the regulator 17 stops output of the PowerGood signal as indicated in the graph 312. At time T6, the voltage supplied from the power supply units 111 to 113 becomes Low, and the value of the Power Good signal also becomes Low. The timing of the voltage supplied from the power supply units 111 to 113 becoming Low and the timing of the PowerGood signal becoming Low are not necessarily be matching. Because the PowerGood signal is stopped if the voltage supplied from the power supply units 111 to 113 decreases, it reaches Low in fixed time independent of the decreasing speed of the voltage supplied from the power supply units 111 to 113.

When the PowerGood signal becomes Low, the SW enable signal turns into Low at time T6 as indicated in the graph 316, and the switch 16 becomes ineffective. When the switch 16 becomes ineffective, connection between the CPLD 15 and the MUX 13 is disconnected. At this time T6, the logic of the path selection out of the four paths extending from the midplane 2 of the MUX 13 changes from a definite state to an indefinite state. To the paths 131 to 133, input of the voltage output from the power supply units 101 to 103 is started. Thus, the voltage of the MUX enable signal starts increasing from time T6 as indicated in the graph 313, and the MUX 13 becomes ineffective. As indicated in the graphs 314 and 315, although the first path-selection signal also starts increasing, the increase speed is slow because the resistance value of the resistors 122 and 123 is high compared to the resistance value of the resistor 121. Accordingly, the first path-selection signal becomes High after the MUX enable signal becomes High. Because the second path-selection signal has had the value of High before the power failure occurs, it maintains the value of High as it is. As described, it is possible to make sure that the MUX 13 is ineffective before the logic of signal path selection of the MUX 13 becomes indefinite, and to disconnect the signal paths among the system boards 1.

Figure 7:
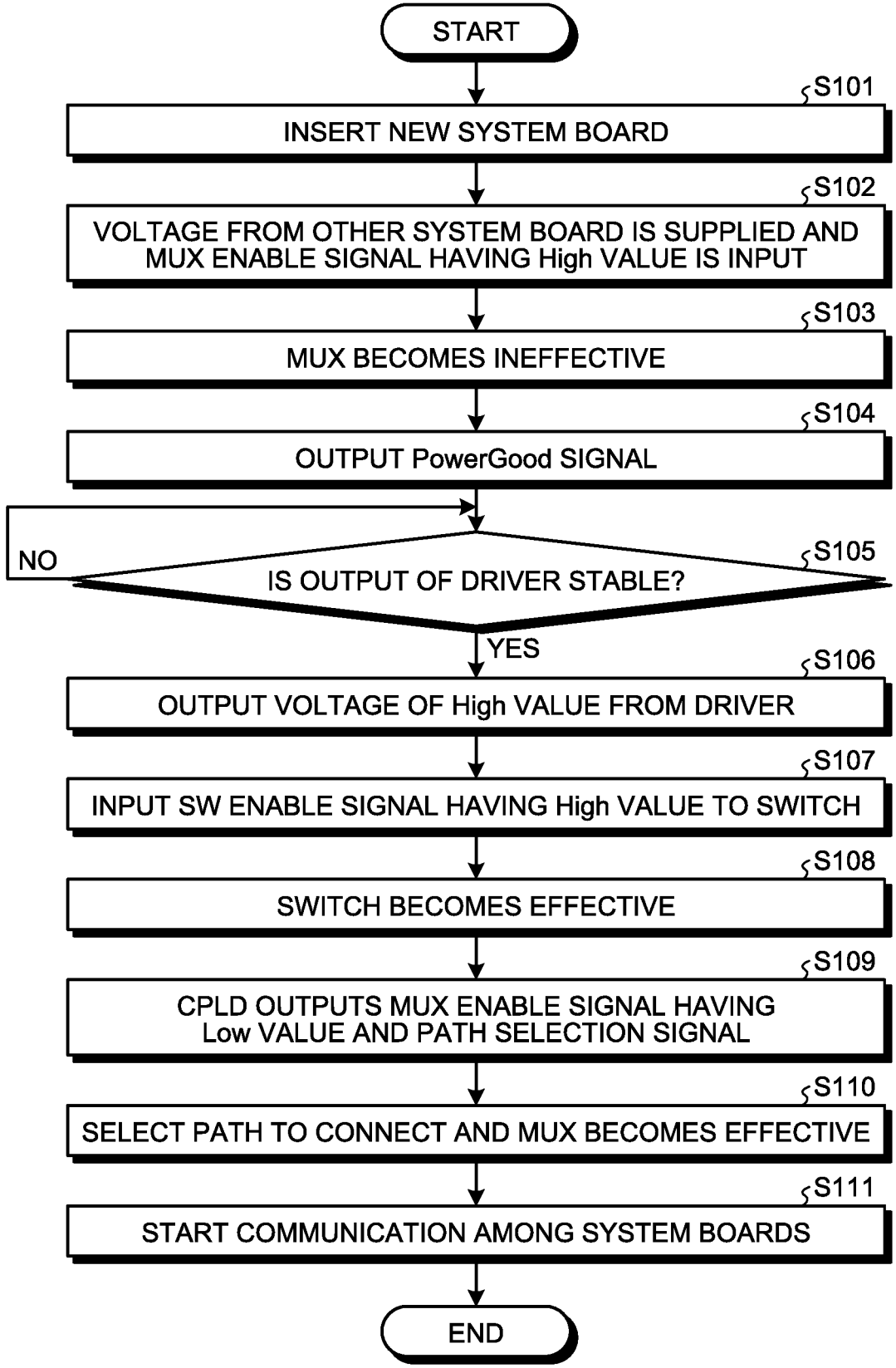
FIG. 7 is a flowchart of CPU connection processing when a system board is inserted.

Next, a flow of connection processing of the CPUs 11 and 12 when the system board 1 is connected to the midplane 2 according to the present embodiment is further explained referring to FIG. 7. FIG. 7 is a flowchart of CPU connection processing when a system board is inserted.

The system board 1 is newly inserted to the midplane 2 (step S101). At this time, the switch 16 is in an ineffective state.

Next, a voltage from the other system board 1 is supplied to the MUX 13 through the midplane 2. The switch 16 maintains the ineffective state. The enable signal having the value of High is input to the MUX 13 from the path 131 (step S102).

Receiving the input of the enable signal having the value of High, the MUX 13 becomes ineffective (step S103).

The regulator 17 compares its own output voltage and a voltage threshold, and outputs the PowerGood signal when the own output voltage becomes equal to or higher than the voltage threshold (step S104).

Thereafter, the driver 18 determines whether its own output voltage has become stable (step S105). When the output is not stable (step S105: NO), the driver 18 waits until the output becomes stable.

When the output becomes stable (step S105: YES), the driver 18 outputs a voltage having the value of High after sufficient time passes (step S106).

When the system board 1 is supplied with power from the power source unit 5 and with power from the other system board 1, the AND circuit 124 receives an input of a signal having the value of High to one of the input systems. Moreover, when the PowerGood signal from the regulator 17, the AND circuit 124 receives an input of a signal having the value of High to the other one of the input systems. The switch 16 receives the SW enable signal having the value of High from the AND circuit 124 after a voltage having the value of High is output from the driver 18 (step S107).

The switch 16 receives the input of the SW enable signal having the value of High to become effective (step S108).

When the switch 16 becomes effective, the CPLD 15 outputs the first and the second path selection signals to the MUX 13. Furthermore, the CPLD 15 outputs the MUX enable signal having the value of Low to the MUX 13 (step S109).

The MUX13 receives first and second path selection signals. The MUX 13 receives the input of the MUX enable signal having the value of Low to become effective. The MUX 13 selects, after becoming effective, a path out of the four paths extending from the midplane 2 according to the acquired first and second path selection signals to connect to the CPUs 11 and 12 (step S110).

Thereafter, the system board 1 newly connected to the midplane 2 starts communication among the other system boards 1 (step S111).

Figure 8:
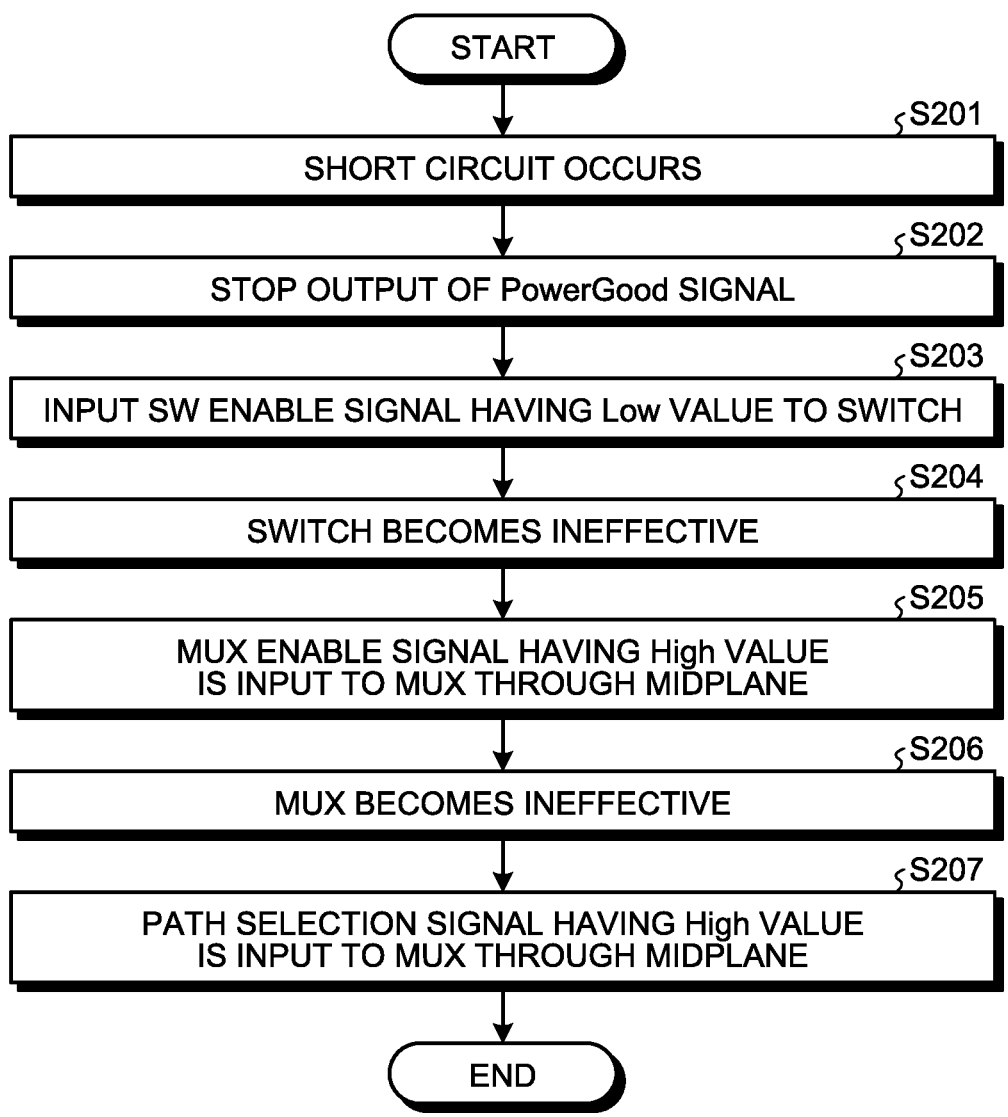
FIG. 8 is a flowchart of CPU disconnection processing when a short circuit occurs in a power source.

Next, a flow of disconnection processing of the CPUs 11 and 12 when a short circuit occurs in the power source in the system board 1 is explained referring to FIG. 8. FIG. 8 is a flowchart of CPU disconnection processing when a short circuit occurs in a power source.

A short circuit occurs in the system board 1 (step S201).

The regulator 17 stops output of the PowerGood signal as the value of the input voltage decreases (step S202).

When power is supplied to the system board 1 from the power source unit 5 and from the other system board 1, the AND circuit 124 receives an input of a signal having the value of High to one of the input systems. On the other hand, as the output of the PowerGood signal from the regulator 17 is stopped, the AND circuit 124 receives an input of a signal having the value of Low to the other one of the input systems. The switch 16 receives an input of the SW enable signal having the value of Low from the AND circuit 124 after the output of the PowerGood signal from the regulator 17 is stopped (step S203).

The switch 16 becomes ineffective by receiving the input of the SW enable signal having the value of Low (step S204).

When the switch 16 becomes ineffective, connection between the CPLD 15 and the MUX 13 is disconnected, and signals output from the CPLD 15 are not to be input to the MUX 13. Subsequently, the MUX enable signal having the value of High input through the midplane 2 is input to the MUX 13 from the path 131 (step S205).

The MUX 13 become ineffective by receiving the MUX enable signal having the value of High input from the path 131 (step S206). When the MUX 13 becomes ineffective, connection between the path extending from the midplane 2 and connecting to the other system board 1 and the CPUs 11 and 12 is disconnected.

Thereafter, the first and the second path-selection signals having the value of High that are input through the midplane 2 are input to the MUX 13 from the paths 132 and 133 (step S207). Note that the MUX 13 has already been ineffective, an influence of the input first and the second path-selection signals does not affect the other system boards 1.

Furthermore, when the other system board 1 is inserted to the midplane 2 while the system board 1 inserted in the midplane 2 is operating in the present embodiment, the regulator 17 supplies power to the additionally inserted system board 1 through the midplane 2.

As explained above, when inserted to the midplane 2, the system board according to the present embodiment makes the MUX ineffective once by using power supplied from the other system board, and connects a path to the other system board with the CPU when sufficient time has passed since the output of the driver becomes stable, that is, when predetermined time has passed. Thus, drawing of signals among the system boards at insertion of the system board can be suppressed, and disconnection of signals among the system boards is enabled soon after insertion. therefore, it is possible to insert the system board to the midplane additionally, while the other system boards maintained active, without affecting the other system boards, and to maintain stable operation of the system.

Furthermore, the system board according to the present embodiment can disconnect connection between the CPLD and the MUX by making the switch ineffective when an appropriate output is disabled in the regulator, and can make the MUX ineffective. Particularly, by varying the resistance values of the pullup resistors of the control signal of the MUX to which a voltage is input from the other system board, it is possible to give time differences in changes of signals when a voltage is input from the other system board. Thus, the MUX enable signal is deasserted before the path selection of the MUX becomes indefinite, to make the MUX ineffective, and signals among the system boards can be disconnected. Thus, an influence of a power failure of the system board on the other system boards can be suppressed, and the stable operation of the system can be maintained. Furthermore, because it is possible to make the MUX ineffective without depending on the power source type input to the system board from the power source unit, the implementation cost can be reduced.

[b] Second Embodiment

Figure 9:
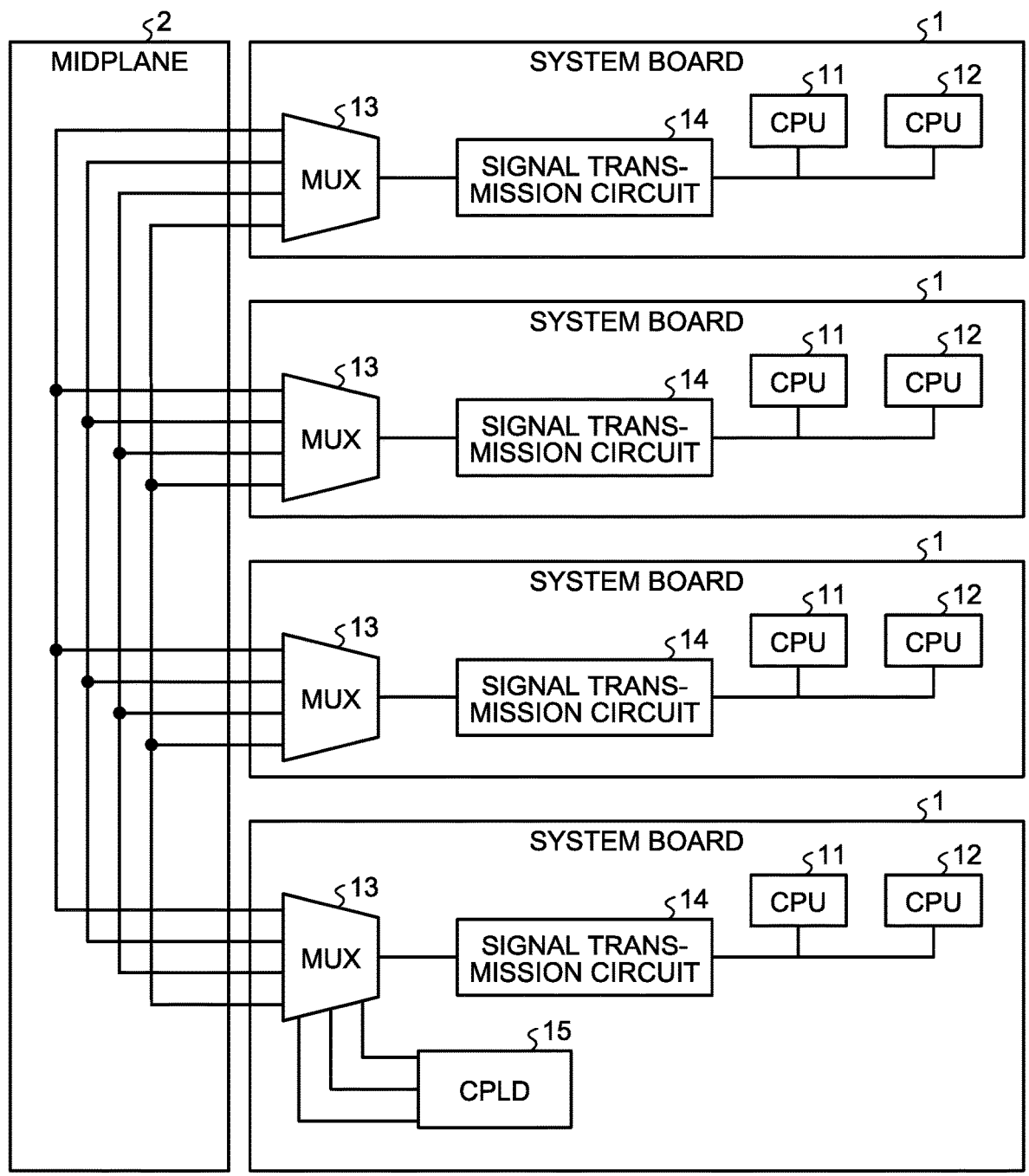
FIG. 9 is a diagram illustrating a connection state of system boards according to a second embodiment.

FIG. 9 is a diagram illustrating a connection state of system boards according to a second embodiment. The information processing system 100 according to the present embodiment differs from the first embodiment in that communications among the system boards 1 are performed using one path in a mutual direction.

Figure 10:
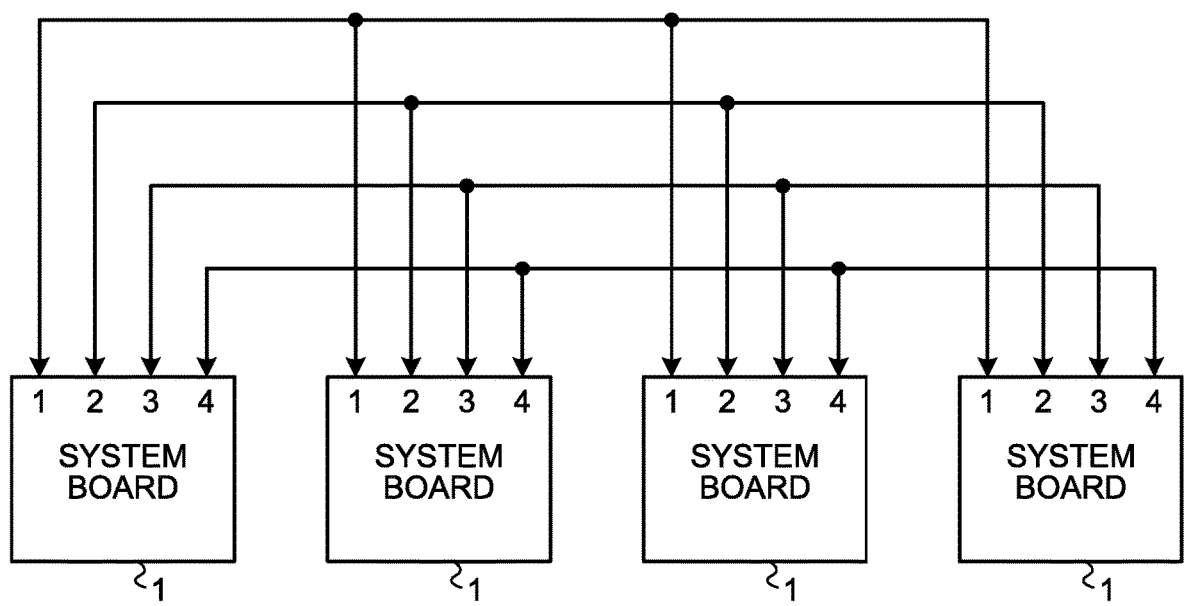
FIG. 10 is a diagram for explaining communications among the system boards according to the second embodiment.

The midplane 2 according to the second embodiment connects the plural inserted system boards 1 mutually, for example, as illustrated in FIG. 9. Transmission and reception of signals among the system boards 1 in the information processing system 100 according to the second embodiment are explained referring to FIG. 10. FIG. 10 is a diagram for explaining communications among the system boards according to the second embodiment.

The system board 1 according to the present embodiment includes four ports as illustrated in FIG. 10. Either one of the four ports is to transmit and receive signals to and from the other system boards 1.

To a path extending from each of the ports of the system board 1, the other three system boards 1 are connected in a daisy chain structure. That is, the path extending from each of the ports of the system board 1 branches off into three, and the branched paths are respectively connected to the different other system boards 1.

In this case, the MUX 13 selects a path from among four paths extending from the midplane 2 to connect thereto for communications between the system board 1 on which the MUX 13 is mounted and the other system board 1. Thus, the MUX 13 enables transmission and reception of signals in a mutual direction between the system board on which the MUX 13 is mounted and the other three system boards 1.

Also when the midplane 2 performs this kinds of connection, similarly to the first embodiment, the MUX 13 is temporarily made ineffective at the time of insertion to the midplane 2, and disconnects signals among the system boards 1. Thereafter, the system board 1 makes the MUX 13 effective and connect the CPUs 11 and 12 after the output of the driver 18 becomes stable. As described, by disconnecting signals among the system boards 1 when inserting to the midplane 2, the system board 1 can be newly added without affecting the other system boards 1 even in a configuration of performing transmission and reception of signals mutually as the present embodiment.

Moreover, the system board 1 makes the MUX 13 ineffective and disconnects signals among the system boards 1 when appropriate output becomes difficult in the regulator 17. By thus disconnecting signals among the system boards 1 when a power failure occurs, it is possible to suppress an influence of the power failure on the other system boards even in a configuration in which transmission and reception of signals are performed mutually as the present embodiment.

As explained above, even in a configuration in which transmission and reception of signals are performed mutually, suppression of an influence of addition of a new system board and a power failure can be achieved with the other system boards maintained active. That is, even in a configuration in which transmission and reception of signals are performed mutually, the stable operation of the system can be maintained.

In one aspect, the present invention enables to maintain the stability of a system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device connected to a power source and another information processing device, comprising: a first arithmetic-processing unit that operates by predetermined power generated based on power supplied from the power source;
   a connection control unit that includes a connection control circuit switching between connection and disconnection of a path connecting the first arithmetic-processing unit and a second arithmetic-processing unit included in the other information processing device;
   first and second input paths that respectively supply first and second control signals giving time differences by supplying power supplied from the power source to input terminals of the first and second input paths respectively through different resistors, the time differences varying according to resistance values of the resistors;
   a signal output circuit that transmits the first control signal to make the connection control circuit effective or ineffective through the first input path, and that transmits the second control signal to control switching of the connection control circuit through the second input path; and
   a switch that controls connection and disconnection of the first and second input paths, disconnects the first and second input paths when the first arithmetic-processing unit is connected to the second arithmetic-processing unit, and then connects the first and second input paths after a predetermined time passes,
   wherein the connection control unit starts operation by receiving a supply of power from the power source when the first arithmetic-processing unit is connected to the second arithmetic-processing unit, that makes ineffective the connection between the first arithmetic-processing unit and the second arithmetic-processing unit when receiving the first control signal to make the connection control circuit ineffective when the first and second input paths are disconnected by the switch, and that makes effective the connection control circuit and connects the first arithmetic-processing unit and the second arithmetic-processing unit based on the second control signal that is transmitted from the signal output circuit when the switch connects the first and second input paths after the predetermined time passes and the connection control unit receives the first control signal from the signal output circuit to make the connection control circuit effective.

2. The information processing device according to claim 1, wherein the predetermined time is at least long enough that operation of at least one of the connection control unit and the first arithmetic-processing unit becomes stable.

3. The information processing device according to claim 1, wherein the connection control unit disconnects connection between the first arithmetic-processing unit and the second arithmetic-processing unit when a failure occurs in the power supplied by the power source to the first arithmetic-processing unit.

4. An information processing system comprising:
   a power source that supplies electric power;
   a plurality of information processing devices; and
   a connection mechanism that enables insertion and removal of the at least first and second information processing devices, the connection mechanism including one or more paths to connect all of the information processing devices that are inserted by a single path,
   each of the information processing devices including
   a first arithmetic-processing unit that operates by predetermined power generated based on power supplied from the power source,
   a connection control unit that includes a connection control circuit switching between connection and disconnection of a path connecting the first arithmetic-processing unit and a second arithmetic-processing unit in another of the information processing devices,
   first and second input paths that respectively supply first and second control signals giving time differences by supplying power supplied from the power source to input terminals of the first and second input paths respectively through different resistors, the time differences varying according to resistance values of the resistors,
   a signal output circuit that transmits the first control signal to make the connection control circuit effective or ineffective through the first input path, and that transmits the second control signal to control switching of the connection control circuit through the second input path, and
   a switch that controls connection and disconnection of the first and second input paths, disconnects the first and second input paths when the first arithmetic processing unit is connected to the second arithmetic-processing unit, and then connects the first and second input paths after a predetermined time passes;

wherein the connection control unit starts operation by receiving a supply of power from the power source when the information processing device is inserted in the connection mechanism and the first arithmetic-processing unit is connected to the second arithmetic-processing unit via the connection mechanism, that makes ineffective the connection between the first arithmetic-processing unit and the second arithmetic-processing unit when receiving the first control signal to make the connection control circuit ineffective when the first and second input paths are disconnected by the switch, and that makes effective the connection control circuit and connects the first arithmetic-processing unit and the second arithmetic-processing unit based on the second control signal that is transmitted from the signal output circuit when the switch connects the first and second input paths after a predetermined time passes and the connection control unit receives the first control signal from the signal output circuit to make the connection control circuit effective.

5. A control method of an information processing device that includes a power source that supplies electric power to a first arithmetic-processing device that operates by power supplied by the power source, the method comprising:

starting operation by receiving power supply from the power source when the first arithmetic-processing device is connected to a second arithmetic-processing device in another information processing device;

transmitting a first control signal via a first input path to make a connection control circuit ineffective, the first input path connected to the power source via a first resistor with a first resistance value;

transmitting a second control signal via a second input path to control switching of the connection control circuit, the second input path connected to the power source via at least one second resistor, each having a different resistance value than the first resistance value, thereby producing the second control signal at a different time than the first control signal, the connection control circuit switching between connection and disconnection of the first arithmetic-processing device and the second arithmetic-processing device based on the second control signal;

making ineffective the connection between the first arithmetic-processing device and the second arithmetic-processing device when the first control signal makes the connection control circuit ineffective, while disconnecting the first input path and the second input path from a signal output circuit by a switch; and making effective the connection control circuit and connecting the first arithmetic-processing device and the second arithmetic-processing device based on the second control signal that is transmitted from the signal output circuit when the switch connects the first input path and the second input path to the signal output circuit after a predetermined time passes, by transmitting the first control signal from the signal output circuit to the connection control circuit to make the connection control circuit effective.

\* \* \* \* \*